May 29, 1945.    R. G. KIMBELL    2,377,156
TIMBER CONNECTOR
Filed Oct. 15, 1943
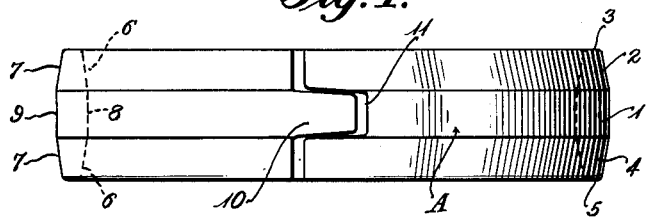
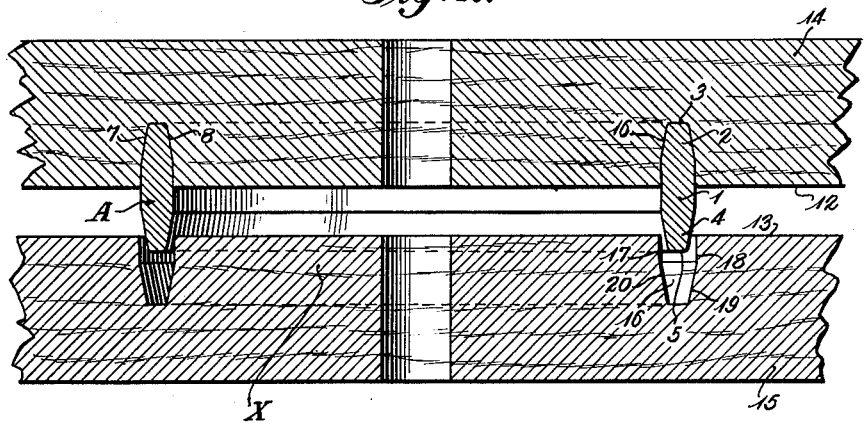
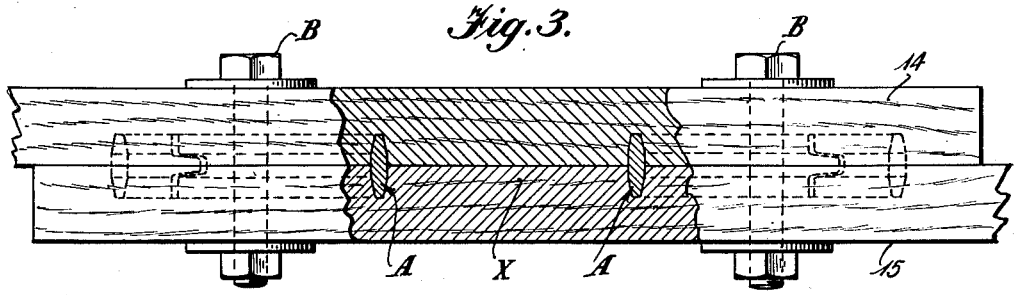
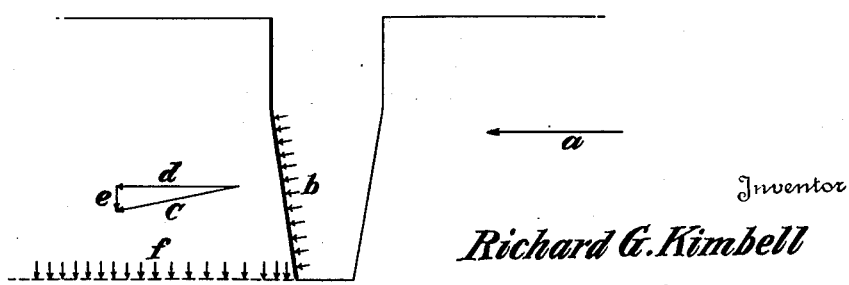
Inventor
Richard G. Kimbell
By *James P. Burns*
Attorney Patented May 29, 1945

2,377,156

UNITED STATES PATENT OFFICE 2,377,156

TIMBER CONNECTOR

Richard G. Kimbell, Chevy Chase, Md., assignor to Timber Engineering Company, Washington, D. C., a corporation of Delaware Application October 15, 1943, Serial No. 506,417

2 Claims. (Cl. 20—92)

This invention relates to an improved timber connector for single and multiple use in timber joints, and more specifically contemplates an improved form of split ring adapted to be received in conformed complementary grooves in opposed faces of overlapping timbers.

A number of years ago, it was discovered that bolted timber joints could be very materially strengthened through the medium of seating a split ring in grooves concentric with a bolt passed through the timbers. The early form of split ring timber connector is illustrated in U. S. Patent No. 1,409,320. This ring made a substantial contribution to the art, and under ideal conditions a joint employing such a ring has a relatively high efficiency as compared to an ordinary bolted joint. This prior art split ring, which has a rectangular cross-section and is therefore adapted to fit only into a pre-cut circular groove with a rectangular cross-section, presented several objections in practice. First, in order to assemble a joint employing the truly rectangular prior art form of ring, it was necessary to maintain a substantial clearance between the split ring and the receiving complementary grooves in the opposing faces of the timbers forming the joint. The provision of this clearance, essential to facility in the assembling of the joint, results in the creation of what is termed an inelastic slip in the joint which leads to deformation of the ultimate timber structure under load. Additionally, even though substantial clearance is allowed between such prior art rings and the exterior diameter of the receiving grooves, serious construction difficulties are created because of the close fit of the interior diameter of the groove which coincides with the interior diameter of the split ring. This second difficulty becomes particularly pronounced in respect to so-called knock-down or portable structures which are required to be disassembled and moved to new locations for reassembly, a commonplace occurrence in respect to military structures.

Some attempts have been made to rectify these difficulties, and some advance was made in the art through the provision of a split ring such as exemplified in U. S. Patent No. 2,150,141. However, even with this structure, it is necessary to maintain a substantial clearance between the split ring and its receiving groove which, as above pointed out, occasions an inelastic slip in the joint. Furthermore, the stresses on the timber core surrounded by the split ring in the completed joint are, if anything, increased, rendering the disassembly and reassembly of a structure extremely difficult. The splitting out of the cores within the confines of the split ring in a joint materially impairs, if it does not wholly destroy the joint for future use.

The problem occasioned by so-called inelastic slip in timber joints has become particularly evident in the present war period, during which long timber span trusses have been employed. In some of these, the inelastic slip in the timber joints has contributed to sags in the trusses used in aircraft hangars to such an extent that they have caused the hangar doors to bind, making the structure unusable.

The present invention contemplates and provides an improved split ring structure that obviates the difficulties above noted incident to the use of the split ring timber connectors of the prior art.

In its more specific aspect, the present invention contemplates and provides a novel split ring timber connector of such character that no clearance beyond the cross-sectional dimension of the ring is required in the complementary grooves provided in the opposed faces of the timbers forming the joint. Additionally, the novel split ring of the instant invention materially facilitates assembly of the timber joints, since the ring structure and the conforming grooves are so shaped as to ensure the rings, in either single or multiple ring joints, being readily received in the conformed grooves. Furthermore, actual tests establish that the split ring timber connector of the present invention permits the production of a timber joint in which the inelastic slip has been reduced by as much as 50 percent over that occurring in joints produced through the employment of prior art structures.

It is a further and more specific purpose of the invention to provide a split ring timber connector adapted to permit not only easy assembly of a timber structure embodying joints employing split rings conforming to the invention, but likewise the easy disassembly of such structures without in any wise impairing the elements of the joints thereof.

The invention will be further explained and the advantages thereof made evident by referring to the accompanying drawing forming a part hereof, and in which:

Figure 1 is a view in side elevation of the improved split ring timber connector of my invention;

Fig. 2 is a cross-sectional view illustrating the manner of assembly of a joint embodying the split ring connector of Fig. 1;

Fig. 3 is a view partly in section of a multiple ring timber joint illustrating the application of my timber connector thereto; and Fig. 4 is a qualitative stress diagram illustrating the desirable effect of beveling the faces of the split ring as in my invention.

Referring to the drawing, there is shown in Fig. 1 a split ring indicated generally by the reference character A, and which embraces a central portion 1 having parallel inner and outer faces, an upper portion 2, the inner and outer faces of which diverge from the upper edge 3 of the ring toward the central portion 1, and a lower portion 4, the inner and outer faces of which diverge from the lower edge 5 of the ring toward the central portion 1.

It will be observed that the portions 2 and 4 of the ring have complementary inner and outer inclined or beveled faces that extend from the edges of the ring to the point of juncture with the inner and outer faces of the central portion 1 of the ring. These pairs of complementary faces are designated 6 and 7 in Fig. 1, whereas the parallel inner and outer faces of the central portion 1 of the ring are designated 8 and 9. The split ring A is provided with a tongue 10 and a complementary receiving recess 11.

Referring to Fig. 2, the ring A is shown in the process of being assembled in a timber joint between the opposed faces 12 and 13 of the timbers 14 and 15. Each of the timbers 14 and 15 is provided with a pre-cut groove 16 conformed precisely to one-half of the split ring A. In other words, each groove 16 has parallel side walls 17 and 18 half the length of the parallel side walls 8 and 9 of the split ring A, and each groove 16 has inclined side walls 19 and 20 corresponding precisely to the inclined faces 6 and 7 of the portions 2 and 4 of the split ring A.

In the position shown in Fig. 2, the upper half of the split ring A is shown as seated in the conformed groove 16 of the timber 14 with the edge 3 of the ring A seated against the bottom of the groove 16 and with the inclined faces 7 and 8 of the portion 2 of the ring snug against the faces 19 and 20 of the groove 16.

The lower edge 5 of the ring A is shown at the point of insertion into the conformed receiving groove 16 in the timber 15, and it will be observed that the conformed groove 16 having the parallel faces 17 and 18 at its mouth is substantially wider than is the thickness of the ring A at its edge 5, so that the arrangement readily facilitates the insertion of the ring A into the groove. Furthermore, as the ring A is pressed home in the groove 16, it does not begin to have frictional contact with the sides of the groove until it is inserted to two-thirds of its depth and even then there is a bevel on both sides which causes the ring to ride into final assembled position without difficulty. The same ease that characterizes the installation of the ring A in the assembly of the joint characterizes its removal in the disassembly incident to the moving of portable and like structures. Furthermore, the ring A may be readily removed from a joint without injuring the core designated generally at X and lying within the confines of the split ring.

The difficulties hereinbefore described with reference to prior art structures are greatly increased in multiple ring joints, since any slight imperfections in alignment of the complementary grooves are greatly augmented. The split ring of the present invention, therefore, finds special merit in multiple ring joints such as shown in Fig. 3, wherein two split rings A are shown in position in an assembled joint, each ring A being used in association with a bolt B extending through the timbers 14 and 15.

In Fig. 4 there is shown a force diagram illustrating the functioning of my improved split ring, more particularly in reference to the timber core designated X in Fig. 2. As shown in this diagram, the force from the ring acting in the direction of the arrow $a$ causes stresses against the groove as indicated at $b$ which, in turn, create a force $c$ in the lumber. The force $c$ may, however, be resolved into its components $d$ and $e$. Force $e$ it will be noted acts downward and will cause a compression increment along the shear line of the core X, as indicated at $f$. It will be appreciated that this is important since connectors exert forces on the wood cores that will create overturning moments on the base of the core. The tension force resulting from these moments will be reduced or overcome by the magnitude of $f$. Without the resistance of stress $f$, the cores would shear off at lower connector loads. The load at which the core shears is, of course, one of the criterions of the strength of the joint. It has furthermore been established that both the proportional limit and the ultimate load are higher for rings conforming to the present invention than for those of prior art construction.

Due to the possibility of employing split rings conforming to the present invention in precisely conforming grooves without any appreciable clearance, the inelastic slip in the resulting joint is very materially decreased, and this decrease in inelastic slip materially lessens the deformation of timber structures under load.

Experience has shown that joints fabricated with applicant's rings have an exceedingly low inelastic slip representing a reduction of around 50 percent over prior art structures. This advantage is also accompanied by a reduction in the slip at design load as well as an increase in both the proportional limit load and the ultimate load.

From the foregoing, it will be apparent that the split ring connector of the instant invention is possessed of significant merit, and it is to be understood that the foregoing description is by way of exemplification and not in limitation of the invention which is comprehended by the subjoined claims.

I claim:

1. An improved timber connector for single and multiple use in timber joints, comprising an expansible split ring adapted to be received in conformed complementary grooves in opposed faces of overlapping timbers, said split ring embracing a first portion centrally positioned intermediate the marginal edges of the ring having a constant internal and external diameter, a second portion extending from said first portion to one marginal edge of the ring, a third portion extending from said first portion to the opposite marginal edge of the ring, the cross sectional dimension of said second and third portions progressively decreasing from their points of juncture with said first portion to the marginal edges of the ring, the opposed faces of said second and third portions diverging from the marginal edges of the ring toward said first portion said first portion adapted when installed to project into the complementary grooves in the opposed faces of the timbers with which the connector is used and provide direct parallel bearing surfaces therein.

2. An improved timber connector for single and multiple use in timber joints, comprising an expansible split ring adapted to be received in conformed complementary grooves in opposed faces of overlapping timbers, said split ring embracing a first portion centrally positioned intermediate the marginal edges of the ring having a constant internal and external diameter, a second portion extending from said first portion to one marginal edge of the ring, a third portion extending from said first portion to the opposite marginal edge of the ring, the cross sectional dimension of said second and third portions progressively decreasing from their points of juncture with said first portion to the marginal edges of the ring, the opposed faces of said first portion being parallel and the opposed faces of said second and third portions diverging from the marginal edges of the ring toward said first portion, the length of the faces of said second and third portions being substantially equal said first portion adapted when installed to project into the complementary grooves in the opposed faces of the timbers with which the connector is used and provide direct parallel bearing surfaces therein.

RICHARD G. KIMBELL.